United States Patent [19]

Scherer

[11] Patent Number: 4,574,063
[45] Date of Patent: Mar. 4, 1986

[54] METHOD OF FORMING GLASS OR CERAMIC ARTICLE

[75] Inventor: George W. Scherer, Big Flats, N.Y.

[73] Assignee: Corning Glass Works, Corning, N.Y.

[21] Appl. No.: 508,185

[22] Filed: Jun. 27, 1983

Related U.S. Application Data

[63] Continuation-in-part of Ser. No. 492,890, May 9, 1983, abandoned, which is a continuation of Ser. No. 339,395, Jan. 15, 1982, abandoned.

[51] Int. Cl.$^4$ .................. C04B 35/14; C03B 37/016
[52] U.S. Cl. .................................. 264/60; 65/18.1; 65/21.4; 264/43; 264/125; 264/338; 501/62; 501/68
[58] Field of Search .............. 264/60, 125, 43, 338; 501/62, 68; 65/18.1, 21.4, DIG. 14

[56] References Cited

U.S. PATENT DOCUMENTS

| | | | |
|---|---|---|---|
| 1,925,985 | 9/1933 | Coss | 264/338 X |
| 2,288,559 | 6/1942 | Ward | 264/338 X |
| 2,498,149 | 2/1950 | Bower | 264/338 X |
| 2,613,397 | 10/1952 | Borkland | 264/338 X |
| 2,714,227 | 8/1955 | Graham et al. | 65/18.1 X |
| 3,670,060 | 6/1972 | Cuffaro et al. | 264/338 X |
| 3,823,995 | 7/1974 | Carpenter | 350/96 |
| 4,042,361 | 8/1977 | Bihuniak | 501/62 |
| 4,135,901 | 1/1979 | Fujiwara | 65/2 |
| 4,200,445 | 4/1980 | Bihuniak | 501/68 |
| 4,266,978 | 5/1981 | Prochazka | 264/125 X |
| 4,313,900 | 2/1982 | Gonzales, Jr. et al. | 264/60 X |
| 4,331,628 | 5/1982 | Ziegler | 264/338 X |
| 4,396,572 | 8/1983 | Batigne et al. | 264/60 X |
| 4,399,089 | 8/1983 | Mohri et al. | 264/60 X |
| 4,419,311 | 12/1983 | Claussen | 264/60 |
| 4,442,175 | 4/1984 | Flannery et al. | 65/21.4 X |

FOREIGN PATENT DOCUMENTS

| | | | |
|---|---|---|---|
| 918896 | 1/1973 | Canada | 264/338 |
| 7307744 | 12/1974 | Netherlands | 264/338 |
| 23577 | of 1913 | United Kingdom | 264/338 |
| 996087 | 6/1965 | United Kingdom | 264/338 |

OTHER PUBLICATIONS

T. C. Patton "Paint Flow & Pigment Dispersion" 2nd Ed., Wiley-New York (1979), pp. 270-271.
A. E. Lewis, J. Am. Cer. Soc., 44 (5) "Polar-Screen Theory for the Deflocculation of Suspensions", (5-61), pp. 233-239.
C. J. Phillips "Glass Its Industrial Applications" Reinhold, New York, pp. 56-57.
*Hackh's Chemical Dictionary,* Fourth Edition, completely revised and edited by Julius Grant, New York, McGraw-Hill, ©1972, pp. 298, 299, 632 and 638.
*The Condensed Chemical Dictionary,* Tenth Edition, revised by Gessner G. Hawley, New York, Van Nostrand Reinhold, ©1981, pp. 964, 970.
Gould, Edwin S. *Inorganic Reactions and Structure,* revised edition, New York, Holt, Rinehart and Winston, ©1965, pp. 374-378.
Parfitt, G. D., Edt. *Dispersion of Powders in Liquids,* Second Edition, a Halsted Press Book, New York, John Wiley & Sons, ©1973, pp. 31-37, 139-141.
Solomon, D. H. and D. G. Hawthorne *Chemistry of Pigments and Fillers* New York, John Wiley & Sons, ©1983, pp. 116-124, 169, 170.

*Primary Examiner*—Philip Anderson
*Attorney, Agent, or Firm*—K. van der Sterre

[57] ABSTRACT

Suspensions of particulate oxides, e.g., fumed silica, are prepared in non-aqueous media and the suspensions are used to cast shapes for glass or ceramic products. The suspensions are formed and then caused to gel by means of an added gelling agent, and thereafter dried and, optionally, sintered to transparent glass or void-free ceramic products.

37 Claims, 3 Drawing Figures

METHOD OF FORMING GLASS OR CERAMIC ARTICLE

CROSS-REFERENCE TO RELATED APPLICATIONS

This application is a continuation-in-part of my co-pending, commonly assigned patent application Ser. No. 492,890, filed May 9, 1983, now abandoned, which is a continuation of application Ser. No. 339,395, filed Jan. 15, 1982 and now abandoned.

BACKGROUND OF THE INVENTION

The present invention relates to a method for making pure, homogeneous porous glass or ceramic bodies from particulate oxide materials such as fumed metal oxides. The porous bodies may be consolidated into dense, void-free glass or ceramic products.

The concept of making glass products at reduced temperatures by sintering a mass of glass particles is old. A number of methods for producing the mass have been considered, including slip casting, compaction, sedimentation and polymerization or condensation from solutions.

Perhaps the most common methods are the solution methods wherein solutions or suspensions of glass-forming constituents are treated to form a precipitate, polymerization product, or gel which is then dried and sintered to form glass. U.S. Pat. Nos. 3,535,890, 3,678,144 and 4,112,032 describe one such approach to glass-forming wherein silicate solutions or suspensions are gelled, dried and fired to produce glasses. Disadvantages of such approaches include the need for a very prolonged and difficult drying process, and only limited product purity due to the presence of iron and other metallic impurities in the starting material. Drying treatments requiring days, weeks or months for completion are not uncommon.

Higher purity can be attained through the use of starting materials such as alkoxides in the precipitating solutions, as noted in G.B. Pat. No. 2,041,913 disclosing an adaptation of such a process to the manufacture of glass optical waveguides. Again, however, the drying step is difficult and prolonged.

Slip-casting methods have long been used to produce ceramic products from particulate oxide materials, and much of the published literature deals with the technology of producing a satisfactory slip. For example, U.S. Pat. No. 2,942,991 teaches the stabilization of an aqueous casting slip while S. G. Whiteway et al., in "Slip Casting Magnesia", *Ceramic Bulletin*, 40 (7) pages 432–438 (1961) discuss the advantages of non-aqueous slips. In contrast to the solution methods discussed above, vehicle removal in slip-casting is relatively quick and easy, due in part to the relatively large particle sizes of the suspended oxides. Hence gelation is easily avoided and the problems of gel fragility and cracking are not encountered, although product configuration is somewhat limited.

Attempts to adapt slip casting technology to the handling of high-purity fumed oxides have been made, as reported in U.S. Pat. Nos. 4,042,361 and 4,200,445. The difficulty with fumed oxides arises in part because they are fluffy, high-surface-area materials (surface areas in the range of 25–400 m$^2$/g with average particle sizes below 1 μm, typically 0.01–0.1 microns) which are hard to handle and difficult to incorporate into flowable suspensions. In addition, the cast suspensions typically crack on drying in the same manner as the solution-made gels. Thus, the teaching of the aforementioned two patents is to use aqueous suspensions of fumed oxides to prepare a partially sintered, comminuted intermediate (particle sizes of 1–10 μm) for use as a starting material in a conventional slip casting process.

It is proposed in G.B. No. 2,023,571 to deposit oxide glasses of controlled composition by drying and sintering oxides from fluid suspensions on the inside of a heated silica tube. While this technique could be used to produce a composition gradient in the deposited glass, the rate of material deposition is slower than would be desired. Also, adherent, crack-free layers are difficult to obtain, and the method somewhat limits the configuration of the product.

It is therefore a principal object of the present invention to provide an improved method for making glass or ceramic products from fumed oxides by sintering methods.

It is a further object of the invention to provide a method for making a glass product of optical quality by a relatively rapid procedure which facilitates the production of pure, void-free products from a particulate suspension of fumed oxides.

Other objects and advantages of the invention will become apparent from the following description thereof.

SUMMARY OF THE INVENTION

The present invention uses stable suspensions of particulate oxides as starting materials for producing glass or ceramic products from gels, the suspensions being so constituted as to substantially simplify subsequent processing and to improve the properties of the resulting products. Although the gels provided from these suspensions must be dried under controlled conditions, drying is relatively rapid and relatively large, crack-free, porous products exhibiting excellent homogeneity are easily obtained. The porous products can readily be sintered to produce dense, void-free glass or ceramic articles.

Advantageously, no composition limitations on the end product are imposed by the nature of the starting suspensions. Essentially any oxidic material which can be produced by flame oxidation or hydrolysis in an appropriate particle size range, or otherwise made in an agglomeration state insuring sufficiently small particle size, can be used.

The method of the invention broadly encompasses the following steps. First, a stable, flowable, non-aqueous supension of a particulate oxidic material is prepared using oxides having particle sizes below about 0.5 microns. The oxides can be prepared, e.g., by flame oxidation and will normally have a surface area in the range of about 25–400 m$^2$/g. The suspension can be prepared by stirring, high-speed mixing, wet-milling or the like, and may be stabilized using added dispersants if necessary to prevent gelling or particle agglomeration and settling.

The use of a non-aqueous, water-free liquid vehicle and, preferably, a water-free oxide, are quite important in attaining the objects of the invention. The presence of water can cause uncontrollable gelation of the suspension. Also, the exclusion of water from the vehicle greatly alleviates preform cracking problems during subsequent processing.

The second step of the process of the invention involves forming the suspension into a selected configuration for the product and causing it to gel in that configuration. This is accomplished by adding a gelling agent to the suspension, either before or after forming, in an amount effective to cause complete gelation. Through the proper selection of the gelling agent and its composition, amounts effective to produce complete gelation can be added without causing immediate gelling. This means that the suspension can be both destabilized and formed prior to conversion to a gelled intermediate mass. Casting is normally the preferred technique for forming the suspension into the desired configuration since the viscosity of the suspension, notwithstanding a rather high solids content, is normally low.

After the suspension has been formed into a selected configuration for a product and gelled in that configuration it is dried in that configuration by expelling the liquid vehicle from the pore structure thereof. The gelled configuration is maintained until the gelled intermediate has substantially dried, in order to minimize the possibility of gel distortion and cracking. By virtue of the homogeneity and relatively large pore size of the gelled material, and because the vehicle is essentially non-aqueous, drying stresses are minimized and drying can be relatively rapid without risking product cracking, so that an integral product having the configuration of the gelled suspension, except for drying shrinkage, can be obtained.

The product resulting from the above-described process is typically very homogeneous in microstructure. It can be used as dried or after partial sintering for any application wherein a pure, microporous support structure, filter, or the like is desired. Alternatively, an additional heating step wherein the product is fully sintered to a dense, void-free glass or ceramic product can be employed. The particle sizes in the dried gel are sufficiently small that sintering is easy, and a transparent glass product is readily obtained.

Gelation of the stable non-aqueous suspensions of the invention can be very rapid, e.g., occurring almost immediately after forming, without detrimentally affecting the pore homogeneity or shape of the fired product. This feature makes the present process particularly useful for layer casting, wherein a product is built up by a succession of cast layers, each layer being cast upon a previously cast underlayer which has gelled sufficiently to provide a good support for the subsequently applied layers within a very short time.

Rapid gelation enhances the feasibility of designing composition gradients into layer-cast products by facilitating the forming of many layers of slightly varying composition in the product structure. One useful way to implement such a procedure is to mix the starting suspension, here termed the first suspension, with at least one additional suspension containing a particulate oxide of a different composition than that contained in the first suspension.

The proportions of each suspension in the mixture are varied in stepwise or continuous fashion as the layers are deposited, to obtain a selected oxide composition in each deposited layer. Mixing can occur before or after gelling agents have been added to one or both of the suspensions, provided that forming can take place before gelling occurs. In this way radial or axial composition gradients can readily be obtained.

BRIEF DESCRIPTION OF THE DRAWINGS

The invention may be further understood by reference to the drawings wherein.

DETAILED DESCRIPTION

The successful practice of the invention initially requires the preparation of a stable fluid dispersion of the oxide particles selected for incorporation into the desired product. By a stable dispersion is meant one wherein the particles will remain in suspension without permanent agglomeration or gelling for a time sufficient to permit the suspension to be shaped by casting or other means. Of course, some settling is permitted if the suspension can readily be established by simple mixing prior to shaping.

Particulate oxidic materials useful in preparing the suspensions include glassy or amorphous oxides, e.g., fumed $SiO_2$, $GeO_2$, $P_2O_5$, mixtures of these fumed oxides with each other or with dopants such as $TiO_2$, $Al_2O_3$, $SnO_2$, $ZrO_2$, $ZnO$, $MgO$, $Sb_2O_5$ and any other fumed oxide or oxide combination which can be prepared by flame oxidation or hydrolysis to form a glassy soot product of the required particle size. In some cases, the product of the invention will be a crystalline ceramic body, and in that case, the suspended particulate oxidic material may be crystalline. Examples of crystalline materials which may be used include crystalline forms of the above oxides and any of the other constituents of conventional or commercial ceramic products which can be prepared in the necessary particle size range.

As previously noted, oxide particle size is quite important in achieving the objects of the invention. It is preferred that particle sizes for the selected oxides fall within the range of about 0.01–0.5 microns, corresponding to a surface area for a sample of the material in the range of about 15–100 $m^2/g$. If smaller particle sizes are used, the drying process is complicated, in some cases requiring resort to autoclave drying at temperatures above the critical point of the vehicle to achieve useful drying rates without cracking.

Although many techniques have been developed for the production of sub-micron-size oxidic particles, the preferred method is flame oxidation or hydrolysis because the fumed products of this method commonly exhibit the necessary particle size and surface area as made. For example, fumed silica particles are typically agglomerates of tiny silica spheres, having the appearance of grape clusters, but the agglomerates seldom exceed 0.5 microns in size and readily form stable colloidal suspensions in appropriate vehicle-dispersant systems.

The use of fumed oxides may be distinguished from prior art methods such as the so-called sol-gel method wherein ceramic products are produced from gels wherein the oxidic material is polymerized or precipitated from within an aqueous or water-alcohol solution. With few exceptions, solution-grown oxidic materials have sufficiently small particle sizes that gels with very small pores are produced. Gels of this type dry extremely slowly and are very difficult to dry and consolidate without cracking, for reasons hereinafter more fully described.

A variety of different ways for providing suspensions of oxide materials in liquid vehicles are known, both from the paint industry and from fundamental research in colloid chemistry. The known mechanisms for stabilizing dispersions by the prevention of particle agglomeration in the vehicle include electrical double layer formation, steric dispersion i.e., dispersion by steric hindrance, and polar screening. The present invention requires the use of a non-aqueous vehicle, most frequently a hydrophobic organic liquid, wherein the preferred method for stabilizing the suspension is that of steric dispersion. In dispersions of this type, the complete absence of water, including water adsorbed onto the particulate oxide added to the suspension, is very desirable since even trace amounts of water can interfere with the stabilization mechanism and promote flocculation of the particles and gelling of the suspension. In fact, water can constitute a useful flocculating or gelling agent in these systems.

To stabilize the dispersion by steric hindrance, a dispersing agent is added to the suspension, typically consisting of a chain-like molecule comprising both hydrophilic and hydrophobic groups. The hydrophilic group, e.g., an —OH or —COOH group, is attracted to and capable of adsorbing on the hydrophilic oxide particles present in the suspension. The hydrophobic group can be a carbon chain or the like which is attracted to the organic vehicle and capable of preventing agglomeration of the particulate phase by steric hindrance.

Stabilization by the technique of steric dispersion is particularly useful because the dispersant layers on the particles are thin, so that rather highly concentrated but stable suspensions may be prepared. Of course, other stabilization techniques including electrical double layer and polar screen methods may be employed, provided stable fluid dispersions capable of flocculation with a compatible gelling agent can be prepared therefrom.

Examples of vehicles which can be used with oxidic particulates such as silica and silicate glasses include hydrophobic solvents such as n-hexane, chloroform, methylene chloride or the like, and also some vehicles which are miscible with water, e.g., n-propanol. Examples of dispersants which can be used in solvents such as above described include stearic acid, stearic alcohol, and even shorter straight-chain alcohols, liquid at room temperature, such as the normal alcohols with carbon chains of 3-10 atoms.

Flocculation or gellation of a steric dispersion produced as above described is thought to involve the displacement of the dispersant from the surfaces of the oxide particles by constituents having a stronger affinity therefor than the dispersant. As already noted, water is one agent which can accomplish this result, although water deflocculation and gellation is a rather slow process in cases where the attachment of a dispersant to the oxide particles is strong. More rapid flocculation and gellation in these cases can be achieved by adding small amounts of aqueous acidic or basic solutions to the suspension, with basic solutions being preferred. Basic media can cause rather rapid gellation at low concentrations in the vehicles tried, whereas rather strong acid solutions are required.

In general, the gelling agent used to destabilize the suspension can simply be added to the suspension in liquid form with mixing to achieve dispersion. Again, however, it is difficult to obtain a homogeneous dispersion of aqueous solutions where highly hydrophobic vehicles such as chloroform are employed. One satisfactory technique to aid homogeneous gelling is to mix the aqueous gelling agent with a quantity of vehicle-miscible liquid such as methanol, and to then add the combination to the suspension. This does not diminish the potency of the aqueous gelling agent in most cases.

A preferred destabilizing technique for some applications, particularly in the case of a very hydrophobic vehicle such as chloroform, is to use a vehicle-miscible or vehicle-soluble gelling agent. A preferred class of gelling agents of this type includes the alkyl amine gelling agents, for example heptylamine or 1,3-diamino propane. The quantity of those gelling agents needed for complete gelation is very small, and the superior miscibility of the gelling agent in the suspension produces a gel of significantly improved homogeneity.

Figure 1:
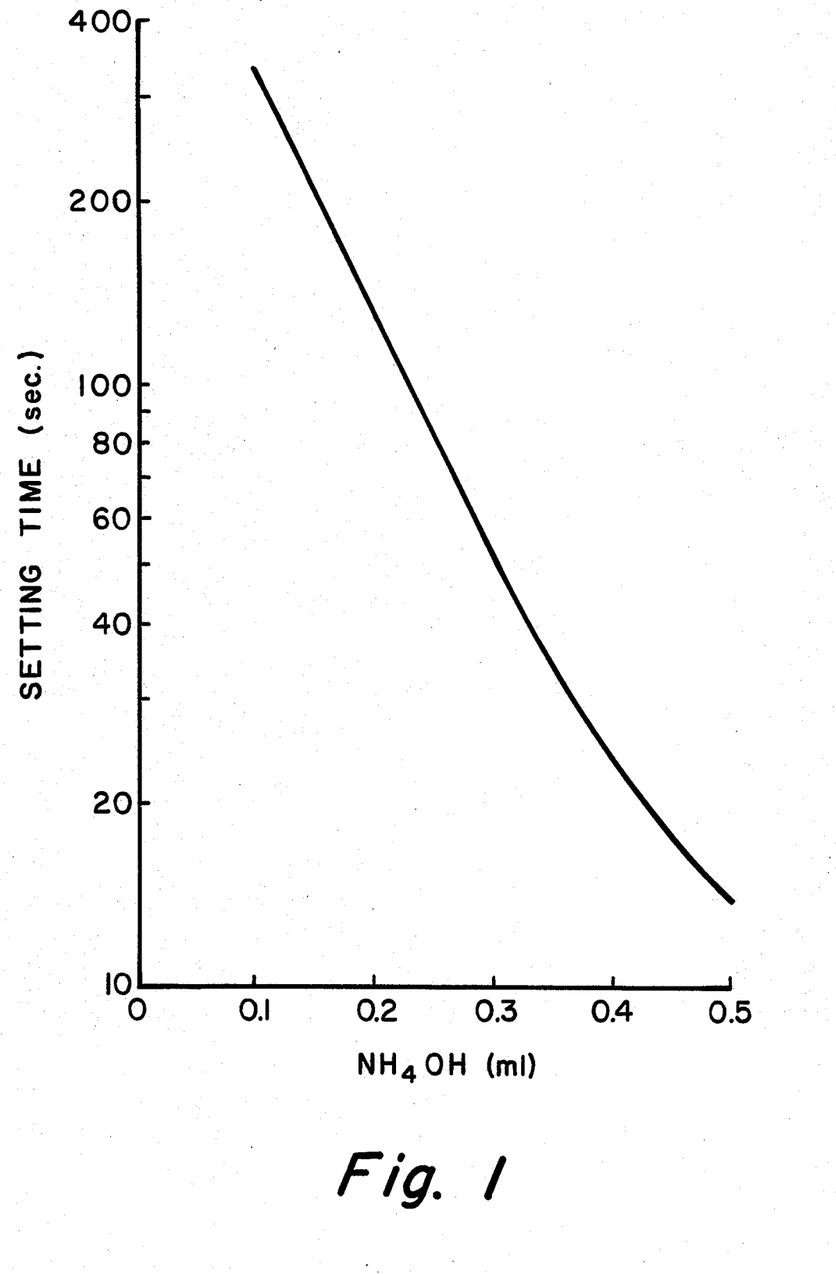
FIG. 1 is a plot of setting time versus concentration for a particular gelling agent/suspension combination useful in accordance with the invention.

It is desirable to cast or otherwise form a destabilized suspension before gellation has been substantially initiated, and for this purpose it is useful to control gelling time by controlling the amount of gelling agent introduced into the suspension. An example of the effect of gelling agent concentration on setting time is shown in FIG. 1 of the drawing, which plots setting time in seconds for a suspension of $SiO_2$ in chloroform stabilized with 1-decanol as a function of the concentration of an $NH_4OH$ gelling agent introduced therein. The gelling solution for the case illustrated consisted of 95 ml methanol, 5 ml water, and 0.2-0.6 ml of 30% aqueous $NH_4OH$ as the gelling agent, the gelling solution being combined with the suspension in a volume ratio of 1 to 3. The strong effect of $NH_4OH$ concentration on setting time, defined as the time interval between the addition of the gelling agent and the time when a sample of the gelling suspension no longer flowed from an inverted test tube, is readily apparent.

An alternative forming procedure is to destabilize and gel the suspension after it has been formed into the desired configuration. It is possible to add liquid gelling agents to the fluid suspension after casting, but a more convenient procedure is to pass a gaseous gelling agent, such as $NH_3$ gas, over, around or through the shaped suspension to cause it to gel in the cast shape.

Because the gelled intermediate produced after casting is relatively weak and subject to cracking in the course of the shrinkage which will accompany the removal of the liquid phase, it has been found very helpful to cast the suspension onto a surface which will deform with the intermediate as it shrinks during drying. One suitable technique for accomplishing this is to line the casting mold with a deformable polymeric layer, such as a thin plastic film, which will adhere to and deform with the intermediate as it shrinks during the early stages of drying. This film can then be conveniently removed after the intermediate has attained sufficient strength in the course of the drying process.

The gelling process, although avoided in certain prior solution methods for forming glasses, is considered a critical aspect of the present invention because it prevents deformation and cracking of the cast suspension during the drying period. As noted in the prior art, even fumed oxide suspensions, if cast without gelling, tend to dry at the outer surfaces thereof, forming a skin which deforms and/or cracks during the ensuing slow drying and shrinkage of the interior.

On the other hand, the strongly gelled structure of the invention does not form a skin but dries uniformly with transport of the liquid vehicle from the interior to the outer surface on a continuous basis as the intermediate is dried. In this way, inhomogeneous drying and nonuniform stress on the drying microporous product is minimized.

The use of a non-aqueous vehicle and control over the particle size or surface area of the suspended particulate oxidic material are particularly important factors during the drying stage of the present process. After a large part of the vehicle has been expelled from the gel and most of the drying shrinkage has occurred, large forces arise in the gel due to capillary tension which develops as the vehicle is replaced by air in the pore structure of the gel. This capillary tension, inversely proportional to the pore size of the gel, is also directly proportional to the surface tension of the vehicle, which in the case of selected organic vehicles can be substantially less than that of water. Thus it is the use of an organic vehicle in combination with particle size control over the dispersed oxide which permits drying of the gelled material without the formation of cracks in a reasonable period of time.

Sintering of the dried porous glass or ceramic product body can be conveniently accomplished by heating at temperatures well below the melting points of the oxides employed. By virtue of the pore homogeneity of the dried product, resulting from controlled gellation and the avoidance of overly large agglomerates during the suspension step of the process, void-free consolidation is readily accomplished and transparent amorphous products, and even transparent crystalline products, are possible. Thus the production of glass and ceramic products at temperatures well below the melting temperatures of their oxide constituents is considerably facilitated.

The invention may be further understood by reference to the following illustrative examples demonstrating the production of ceramic products in accordance therewith.

EXAMPLE I

A particulate oxidic material consisting of a $SiO_2$ soot is prepared by flame hydrolysis. An oxygen carrier gas is bubbled at a rate of 1.55 standard liters per minute (slpm) through a reservoir of $SiCl_4$ maintained at 36° C. The resulting $O_2$—$SiCl_4$ vapor stream is fed to a flame oxidation burner of the type described in U.S. Pat. No. 4,165,223, along with natural gas and oxygen for the burner flame at flow rates of 2.5 slpm and 2.5 slpm, respectively. An inner shield oxygen flow of 2.5 slpm and an outer shield oxygen flow of 3.8 slpm are also provided to the burner as described in the patent.

The soot resulting from the combustion of the chloride gases in the burner under the conditions described is directed down a glass tube where it collects on the wall of the tube for subsequent removal. As prepared, this soot has several weight percent of adsorbed $H_2O$ and HCl. To remove these contaminants and obtain a pure dry oxidic product, the soot is heated to about 800° C. in flowing dry $N_2$ for a period of about one hour. The product is a dry $SiO_2$ soot having a surface area of about 76 $m^2/g$, or a particle size averaging about 0.04 microns.

In order to prepare a stable dispersion, a soot produced as described is first dried at 200° C. to remove any adsorbed water collected in storage. It is then placed in a dry environment, for example a glove box, to keep it dry until use.

A chloroform vehicle is purified by distillation and a 1-decanol dispersant is dried by filtering through a molecular sieve. The vehicle for the suspension is then prepared by adding 14.4 ml of 1-decanol to 150 ml of the chloroform solvent with mixing.

The vehicle thus prepared is transferred into the glove box and a 60 g sample of the dry soot is mixed with the vehicle in a Teflon ® plastic milling jar, to which are also added a number of Teflon ® cylinders for mixing. The plastic jar is then capped, removed from the glove box, and the mixture ball-milled by rotating the jar for twelve hours to obtain a good dispersion of the soot in the vehicle. The product is a stable dispersion of $SiO_2$ in chloroform, exhibiting good fluidity and excellent resistance to flocculation and settling.

The gelling agent to be used to gel this suspension is a water-methanol mixture comprising 95 ml $CH_3OH$ and 5 ml $H_2O$ by volume to which is added 0.5 ml of 30% aqueous $NH_4OH$ as the principal gellant. To obtain good mixing of the gelling agent and the suspension, each is loaded into a separate graduated funnel and exposed to a partial vacuum (20 inches of mercury) for about 5 minutes. This treatment removes dissolved gas from the liquids and minimizes bubble evolution in the course of mixing.

The suspension and gelling agent are separately delivered into a mixing chamber containing a magnetic stirring element, at a ratio of 3 parts of suspension to 1 part of gelling agent by volume. The suspension/gelling agent mixture is then dispensed from the mixing chamber into a plastic-lined mold.

The mold employed is a rectangular container about 6.2×7.5 cm in area in which is placed a sheet of 2-mil polyethylene film as a flexible liner. The suspension and gelling agent fill this mold to form a mass of the same area about 1 cm in thickness. Gellation of this casting to a nonflowable mass occurs within an interval of about 2 minutes after casting.

The gelled intermediate thus provided is dried at a suitable rate to a porous solid. Drying is carried out in a circular vented glass evaporation chamber about 30 cm in diameter which incorporates vent holes having a total surface area of about 0.8 $cm^2$. This venting controls the evaporation rate of the liquid vehicle and ensures that cracking will not occur. Crack-free drying occurs over a period of about 72 hours at room temperature, with shrinkage of about 25% (linear) in the dimensions of the product.

The dried gel is exposed to vacuum for a few hours and then heated to 800° C. in oxygen to remove residual organic constituents therefrom. A heating rate of about 50° C./hr is used, although much faster heating rates can be employed. No structural change in the porous intermediate is detectable during this drying process.

Figure 2:
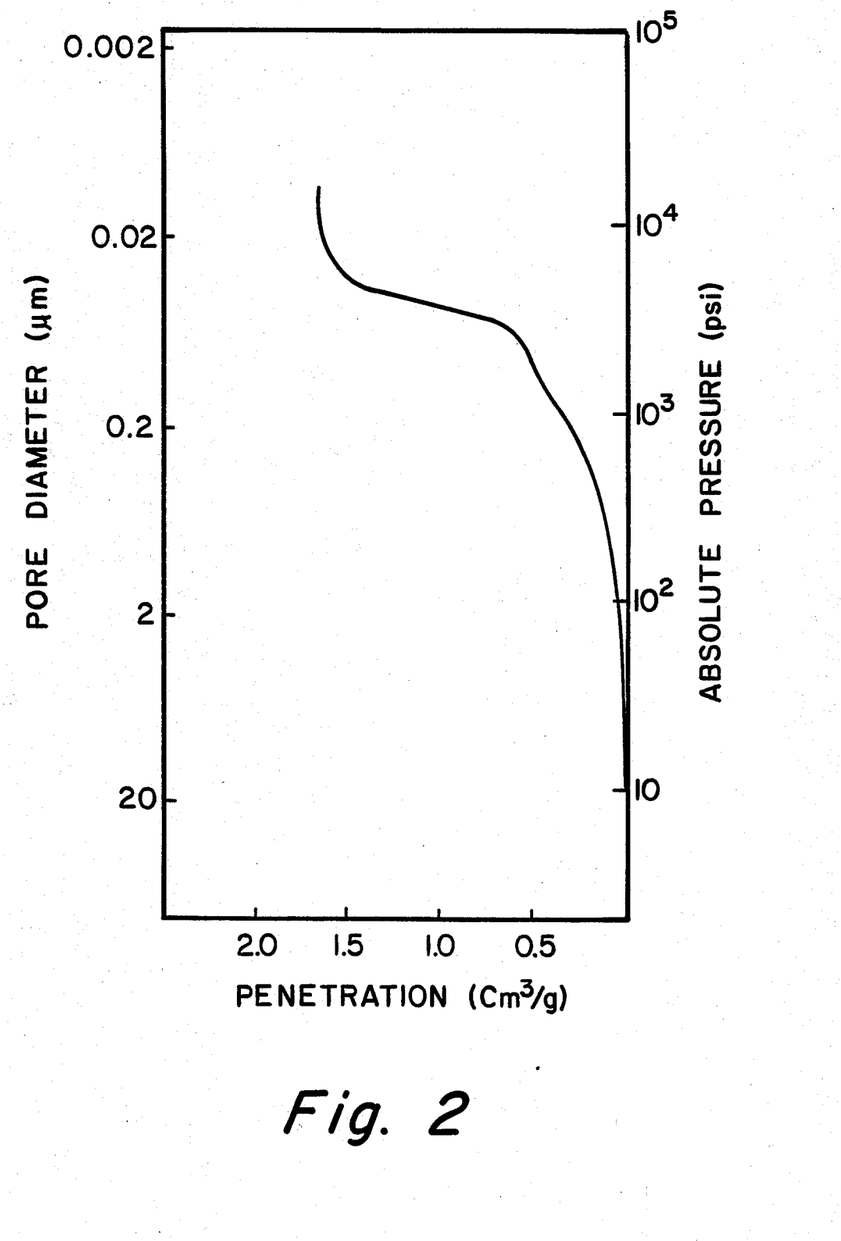
FIG. 2 is a porosimetry curve for a product provided in accordance with the present invention, and, FIG. 3 is a process flow diagram setting forth process steps for the manufacture of a glass or ceramic article in accordance with the invention.
Figure 3:
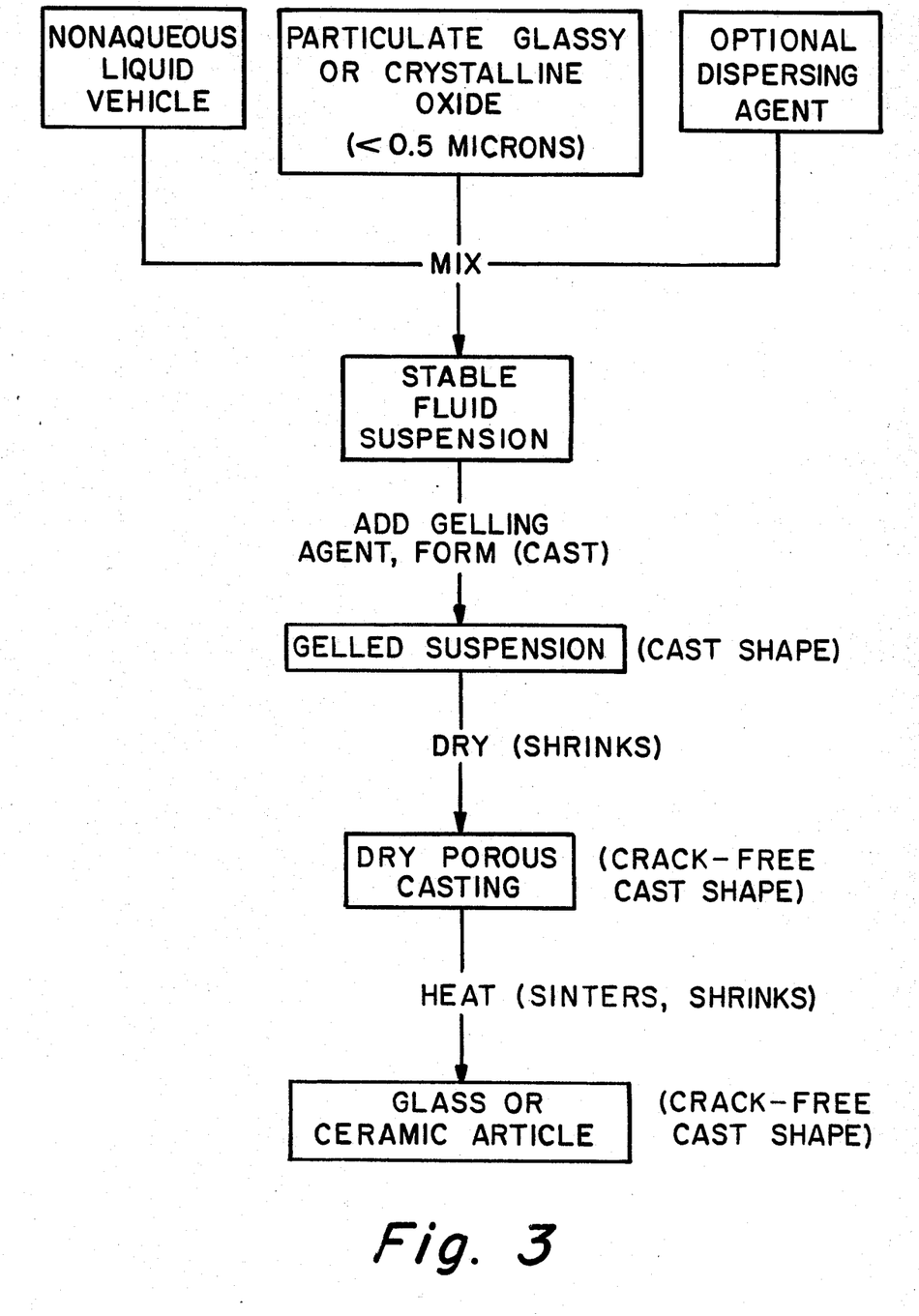

Mercury penetration porosimetry of the dried gel indicates a porosity of about 65%, with the pore size showing a bimodal distribution. The structure comprises one group of pores near 40 nm in diameter and another group in the 200–300 nm diameter range. A typical porosimetry curve for such a product is shown in FIG. 2 of the drawing. Such a product could be used, for example, as a catalyst or enzyme support, as a filter, or for any other article wherein homogeneous porosity is desired.

Sintering of the dried porous product is suitably accomplished in an inert atmosphere, e.g., a helium atmosphere, and full consolidation can be achieved within an interval of less than 30 minutes at 1350° C. Shrinkage during this step of the process is typically about 40% (linear), the product being an essentially clear glass plate of very pure $SiO_2$ about 2.8×3.4 cm in size, containing only a few small scattered seed defects.

EXAMPLE II

In an alternative and preferred gelling procedure, the stabilized silica-chloroform suspension of Example I is destabilized and gelled using a vehicle-miscible alkyl amine gelling agent. The selected gelling agent, heptylamine, is added to a chloroform vehicle for the purpose of dilution, the final concentration of the amine in the chloroform gelling solution being 600 parts per million by volume. This solution is combined with a silica-chloroform suspension of the type described in Example I in the stirred mixing chamber of that example in a volume ratio of 3 parts suspension to 1 part of the gelling solution.

The destabilized suspension thus prepared may be cast as in Example I, and will gel in the casting mold within about 4 minutes. The resulting gel may be dried and consolidated in accordance with the procedure of Example I to obtain a clear glass product. However, because of the high miscibility of the gelling agent, the gel exhibits improved homogeneity and the consolidated glass product exhibits improved transparency and complete freedom from seed defects.

While in the foregoing examples the stabilization of the suspension was accomplished by steric dispersion, the following example describes a suspension wherein no added stabilizing agent is present.

EXAMPLE III

A 120 g sample of a silica soot produced as described in Example I, having a surface area of 86 $m^2/g$ and a particle size averaging about 0.03 microns, is added to 300 ml of 1-propanol in the milling jar of Example I and the mixture is ball-milled in the jar by rotation for 12 hours. The product is a stable suspension of fumed silica, although in this case no dispersant has been added.

A solution to be used as the gelling agent for this suspension is prepared as in Example I, except that 8 ml of 30% aqueous $NH_4OH$ is added to 95 ml. $CH_3OH$ and 5 ml of $H_2O$ to provide the solution. This solution is then combined with the propanol-silica suspension in a ratio of 3 parts of the suspension to one part of the gelling agent by volume in the magnetic mixing chamber of Example I, and the mixture is dispensed into a square mold about 12.5 cm. on a side to a depth of about 1.2 cm. Gelling of the mixture occurs within an interval of about 5 minutes.

The gelled mass is dried in the mold in the drying chamber described in Example I, with substantially complete evaporation of the vehicle occurring within 144 hours at room temperature, without any cracking of the cast plate. The dried mass is about 10×10×0.9 cm in size.

This dried mass can be sintered to a clear glass plate, if desired, by heating to a temperature of 1350° C. in an inert atmosphere such as helium. Complete consolidation occurs within an interval of about 30 minutes. Shrinkage during firing is about 40% (linear).

EXAMPLE IV

The preparation of a product from a doped fused silica or other pure glass fumed oxide proceeds in a manner substantially analogous to that of Example I. A doped fused silica soot consisting essentially of 15% $GeO_2$ and 85% $SiO_2$ by weight is prepared using a flame oxidation procedure as in Example I. A reactant vapor stream is provided by 1 bubbling oxygen at a rate of 1.55 slpm through a reservoir of $SiCl_4$ maintained at 36° C., and oxygen at a rate of 0.41 slpm through a reservoir of $GeCl_4$ maintained at 60° C. The $O_2$—$SiCl_4$ and $O_2$—$GeCl_4$ vapor streams are mixed and fed to the oxidation burner along with a flame feed consisting of 1.3 slpm of natural gas and 1.3 slpm of oxygen. The burner is also provided with outer shield oxygen at a rate of 1.8 slpm and inner shield oxygen at a rate of 0.8 slpm.

The soot resulting from the combustion of the burner gases under these conditions is collected in a tube as in Example I. It is then removed and heated to 800° C. in air to remove adsorbed $H_2O$ and HCl and stored for subsequent use. The product is a pure $GeO_2$—$SiO_2$ soot with a surface area of about 87.5 $m^2/g$.

To prepare a suspension of this fumed oxide, a 60 g sample is heated to 400° C. in air to desorb water, and then quickly mixed with 100 ml of chloroform containing 17.5 ml of added 1-decanol as a dispersing agent in a small high-speed blender.

A 60 ml sample of the suspension thus prepared is destabilized in an open beaker by adding 4 ml of a gelling agent solution thereto with magnetic stirring. The gelling agent solution consists of 1 ml $H_2O$ as the gelling agent, mixed with 79 ml $CH_3OH$.

The destabilized suspension thus provided is formed by casting into a cylindrical mold lined with plastic film where it gels within an interval of about 5 min. This casting is then permitted to dry in the open air. Substantially complete drying of the casting, with some cracking due to the speed of the drying process, is accomplished within an interval of 18 hours. The dried product is then sintered to a clear glass piece at 1400° C. within 30 minutes.

EXAMPLE V

The preparation of a stable suspension of a crystalline fumed oxide material follows substantially the procedure employed for the amorphous or glassy materials described in the previous examples. A crystalline fumed titanium dioxide is prepared using the above-described flame hydrolysis burner fed with a reactant stream produced by bubbling nitrogen at a flow rate of 1 slpm through a reservoir of titanium isopropoxide, $Ti(i-OC_3H_7)_4$, being maintained at 170°–180° C. and then adding by-pass nitrogen to the bubbler flow to produce a total reactant stream flow of 1.5 slpm. Combustion of this stream is achieved by means of a gas-oxygen mixture consisting of 5.6 slpm of natural gas and 5.6 slpm of oxygen, the burner also being provided with inner shield oxygen at a flow rate of 2.8 slpm and outer shield oxygen at a flow rate of 2.8 slpm. The product is a pure $TiO_2$ soot having a surface area of about 14.3 $m^2/g$.

To prepare a suspension of this oxide, a 60 g sample of the material which has first been heated to 400° C. under vacuum for 1 hour and thereafter kept in a glove box is placed in a plastic mixing jar containing several plastic milling cylinders along with 150 ml. of a chloroform vehicle and 8 ml of an oleic acid dispersant. This combination is milled in the jar overnight. The product of this process is a stable, fluid, colloidal suspension of pure $TiO_2$ in chloroform.

A gelling solution for this suspension is prepared by combining one part $H_2O$ by volume and one part trifluoroacetic acid by volume as gelling agents with 10 parts by volume of methanol. A 50 ml sample of the $TiO_2$ suspension is then shaken in a closed container with 5 ml of the gelling solution and the shaken mixture is cast into a square mold 5 cm on a side to a depth of about 0.4 cm. Gellation of the cast suspension is rapid and drying of the gelled suspension is permitted to occur over an interval of about 24 hours. Some cracking of the gel occurs on drying, presently attributed to the presence of air bubbles in the casting, but no granulation is observed, the product consisting of three large, crack-free sections of the original casting.

EXAMPLE VI

A useful technique for layer casting, e.g., to provide a succession of gelled layers on a stationary or moving substrate, is to provide the gelling agent as a gas which contacts the suspension as the layers are deposited. In a specific example of this technique, a stable suspension of $SiO_2$ is prepared by adding a 60 g sample of dry $SiO_2$ soot produced as described in Example I to a chloroform vehicle consisting of 110 ml of chloroform and 14.4 ml of 1-decanol, with jar milling as in Example I.

The $SiO_2$ suspension thus provided is fed into a rotating mold consisting of a plugged, horizontally positioned glass cylinder about 7 cm in diameter and 30 cm in length, the cylinder being rotated about the cylinder axis at about 160 rpm. The suspension feed line is a movable delivery tube inserted through one end plug which repeatedly traverses the length of the cylinder along the axis of rotation, depositing the suspension as a coating on the moving cylinder wall at a rate of about 48 ml/min.

The gelling agent for this suspension is gaseous $NH_3$ which is supplied through an opening in the opposite end plug at a rate of about 0.4 slpm. Casting is commenced after $NH_3$ has displaced most of the air within the cylinder. Under the conditions described, gelling of the flowing suspension is initiated even before the suspension reaches the cylinder wall, and successive layers of the rapidly gelling suspension can readily be deposited without disrupting the integrity of underlying layers. The gelling rate may be controlled by diluting the $NH_3$ with an inert gas such as nitrogen, if desired.

The above-described technique would have particular application if it were desired to provide a cylindrical or other member exhibiting an axial or radial composition gradient. The composition of the suspension could be changed in continuous or stepwise fashion as the delivery tube traversed the cylinder, providing succeeding layers of preselected composition on the mold wall. Similarly, layer casting can be used to produce plates or blanks of graded composition. Advantageously, there is no need to heat the mold to expel the vehicle; rather the gelled casting can be dried as a unit after layer deposition has been completed.

U.S. Pat. Nos. 4,135,901 and 3,823,995 describe the known use of particulate glass to make glass optical waveguides. Glass products produced by processing as hereinabove described have sufficient optical quality that they can be used as components of low loss glass optical waveguides, as illustrated by the following examples.

EXAMPLE VII

A vehicle mixture for a fumed oxide suspension is prepared which consists of about 150 ml. chloroform as the solvent and 16.8 ml. 1-propanol as the dispersant. To this vehicle is added a fumed oxide consisting of 72 grams of $SiO_2$ of 0.06 microns average particle size produced by flame oxidation, which had been fired at 1000° C. for one-half hour in oxygen. Before being used this silica is dried at 200° C. for 1 hour in a vacuum to remove water adsorbed in storage.

The fumed oxide is dispersed in the vehicle mixture by ball-milling the two together for about 16 hours. The suspension is then centrifuged at 2000 rpm for 10 minutes to remove any large agglomerates.

The suspension thus provided is poured into a separatory funnel for controlled transfer to a forming mold. A partial vacuum is applied to this funnel to de-air the suspension. A 3 mm. Teflon ® plastic tube connects the funnel outlet to a bottom inlet in the mold, which is for a preform of rod configuration.

The mold used to form the rod is a cylindrical polyethylene bag about 3.2 cm. O.D.×35 cm. long. The bottom inlet consists of a ⅛" Teflon ® plastic tube sealed into the bottom of the bag. The top of the bag is supported and held open by a ground joint at the top of a cylindrical glass mold holder about 6.4 cm. O.D.×40 cm. long, into which the bag is suspended. This holder is equipped with closeable 6 mm. O.D. top vents.

A valve on the separatory funnel is opened and the suspension is allowed to flow by means of gravity at about 6 ml./min. into the bottom of the bag mold. By delivering from the bottom, trapped air in the casting is avoided. Using 180 ml. of the suspension, a casting approximately 3.2 cm. O.D.×22 cm. long is formed.

Once the bag is filled, the vents are closed and a gelling agent consisting of gaseous $NH_3$ is flowed into the mold holder and around and over the open bag at a rate of about 35 cc./min. for 15 minutes. This treatment is sufficient to completely gel the suspension to a semi-solid gelled casting for a glass rod.

After this casting has gelled, the vents in the top of the mold holder are opened and the casting is permitted to dry. Complete drying to an integral, porous oxide preform, with some shrinkage but without cracking, is accomplished in approximately 72 hours.

The dried rod preform thus provided, now about 2.5 cm. O.D.×20 cm. long, is placed in a vacuum for 3 hours and thereafter heated to 1000° C. in oxygen to remove any residual organic constituents. It is then further heated for consolidation to a temperature of 1500° C., in an atmosphere of helium containing 2 vol. % chlorine, to produce a transparent glass rod approximately 10 cm. long×15.6 mm. O.D.

The glass rod thus provided, which is a consolidated preform for a core element of an optical waveguide fiber, is drawn into glass cane about 4 mm. in diameter. It is then coated with a soot layer composed of a particulate borosilicate glass by a known flame oxidation process. This soot layer is thereafter consolidated to a transparent cladding layer and the clad preform drawn into an optical waveguide fiber with a diameter of approximately 125 μm.

The fiber thus provided has a core 19 microns in diameter composed of fused silica and cladding of borosilicate glass having a refractive index lower than that of silica, the fiber having a numerical aperture of 0.10. The attenuation of the fiber is 14 db/km at a wavelength of 850 nm, the majority of this attenuation being attributed to bending losses, due to the relatively low numerical aperture of the fiber.

EXAMPLE VIII

A vehicle mixture for a fumed oxide suspension is prepared which consists of about 408 ml. chloroform as the solvent and 60.8 ml. 1-propanol as the dispersant. To this vehicle is added a particulate fumed oxide consisting of 196.5 grams of colloidal silica, this silica having an average particle size on the order of 0.06 microns and being commercially available as OX-50 silica from Degussa, Inc., Teterboro, N.J. This silica had been heated to 1000° C. for ½ hour in oxygen to remove bound water, and prior to use is dried at 200° C. for 1 hour in a vacuum to remove adsorbed water.

The silica is dispersed in the vehicle mixture by ball-milling the two together for about 16 hours. The suspension thus provided is then centrifuged at 2000 rpm for 10 minutes. The centrifuged suspension is then poured into a separatory funnel and de-aired by the application of a partial vacuum as in Example VII above.

The de-aired suspension is drawn from the funnel through a plastic tube to a glass delivery cylinder by means of a motor-driven plastic piston in the cylinder. It is then forced by the piston into a bag mold through a flexible plastic tube terminating in a 14-inch long stainless steel delivery tube, the latter tube having an inside diameter of ⅛ inch.

The bag mold is configured to provide a rod-shaped casting for the core element of an optical waveguide fiber, consisting of a polyethylene bag 1⅞" O.D. ×14" long. One end is heat-sealed shut and the other end is held open by a ground glass joint at the top edge of a 2¼" O.D.×16" long cylindrical glass mold holder into which the bag is suspended. Both the ground glass top for the mold holder and the bottom section of the mold holder are equipped with ¼" O.D. vent tubes.

To fill the mold, the stainless delivery tube is inserted through the top vent of the mold holder and into the mold, being positioned within ½" of the bottom of the bag. The colloidal suspension is then injected into the bag from the delivery cylinder at a rate of about 15–30 ml./min. As the mold is filled the delivery tube is withdrawn so that air bubbles are not trapped in the suspension.

After the mold has been filled, the vents are closed and ammonia is flowed into the mold holder and around the casting at a flow rate of 35 cc./min. for 85 minutes. At the end of this interval the suspension has gelled to a semisolid casting and is ready for drying.

Drying is carried out by opening the vent holes in the mold holder, permitting the vehicle to slowly evaporate over an interval of 16 days. Final drying is then accomplished by placing the integral rod preform, now 1⅛×8 inches in size and essentially free of cracks, in a vacuum for 3 hours, and then heating it to 1000° C. in oxygen for 90 minutes to remove residual organics.

Consolidation of the porous preform to clear glass is accomplished by further heating the rod to 1500° C. in a helium atmosphere containing 2 vol. % $Cl_2$ gas. The transparent consolidated rod is about 4 inches long and ⅞ inch in diameter.

The transparent rod is then drawn into an optical waveguide fiber core element approximately 125 microns in diameter. As it is drawn, it is coated with a silicone plastic coating material having a lower refractive index than that of silica. This coating constitutes a transparent cladding element for the optical waveguide fiber. The optical attenuation of this waveguide is about 3.6 db/km at a wavelength of 850 nm.

By virtue of the flexibility of the suspension casting and gelling techniques of the invention it is possible to form core elements, cladding elements, core-cladding combinations, and core elements of non-uniform (e.g., graded) refractive index by direct casting as above described. The latter are obtained using the layer casting technique discussed above by varying the composition of the suspension as it is being cast.

Where the article to be formed is a glass core element for an optical waveguide, the cladding element can be applied by casting a second suspension around the gelled first suspension or, alternatively, by other cladding techniques. For example, a cladding could be applied by flame hydrolysis after the casting for the core element is dried, or after it is consolidated to clear glass. A plastic cladding may be applied during or after the core element is formed from the consolidated preform by drawing.

Of course, the foregoing examples are merely representative of products which could be provided in accordance with the invention. Numerous variations and modifications of this procedure may be resorted to by those skilled in the art within the scope of the appended claims.

Thus the invention constitutes a substantial improvement over the so-called solution methods for forming silicate glasses wherein fluid compositions are gelled and the gelled intermediate dried over prolonged periods and sintered to produce microporous or non-porous glasses. Through the use of non-aqueous suspensions of particulate oxides of the above-disclosed particle size, and the process of gelling the suspension after forming it into a product of the desired configuration, crack-free drying of the product is considerably facilitated and relatively large, crack-free products can more quickly and easily be obtained.

I claim:

1. A method for making a porous glass or ceramic product which comprises the steps of:
   (a) suspending a particulate glassy or crystalline oxide in a non-aqueous liquid vehicle to provide a stable fluid suspension of oxide particles, said particles having an average diameter not exceeding about 0.5 microns;
   (b) forming the suspension into a selected configuration corresponding to that of the product to be made and causing the suspension to gel in that configuration, gellation being caused by the addition to the suspension of a gelling agent in an amount at least effective to produce a gelled intermediate, and
   (c) drying the gelled intermediate while maintaining the configuration thereof to provide an integral, essentially crack-free porous product having the configuration of the gelled intermediate.

2. A method in accordance with claim 1 which comprises the further step, after drying, of heating the porous product to a temperature at least sufficient to at least partially sinter the oxide particles.

3. A method for making a non-porous glass or ceramic product which comprises:
   (a) suspending a particulate glassy or crystalline oxide in a non-aqueous liquid vehicle to provide a stable fluid suspension of oxide particles, said particles having an average diameter not exceeding about 0.5 microns;

(b) forming the suspension into a selected configuration corresponding to that of the product to be made and causing the suspension to gel in that configuration, gellation being caused by the addition to the suspension of a gelling agent in an amount at least effective to produce a gelled intermediate;

(c) drying the gelled intermediate while maintaining the configuration thereof to provide an integral, essentially crack-free porous product having the configuration of the gelled intermediate; and (d) consolidating the porous product by heating it to a temperature at least sufficient to sinter the porous product to a non-porous glass or ceramic product.

4. A method in accordance with claim 3 wherein the non-porous product is formed of transparent glass.

5. A method in accordance with claim 3 wherein the suspension is formed by casting.

6. A method in accordance with claim 5 wherein the casting is formed in a mold which consists essentially of or is lined with a deformable polymeric sheet, said sheet adhering to and shrinking with said gelled intermediate during drying.

7. A method in accordance with claim 3 wherein the liquid vehicle is a hydrophobic organic liquid.

8. A method in accordance with claim 3 wherein the vehicle is selected from the group consisting of chloroform, n-hexane, octane and methylene chloride.

9. A method in accordance with claim 3 wherein the liquid vehicle is a water-miscible organic liquid.

10. A method in accordance with claim 9 wherein the liquid vehicle is n-propanol.

11. A method in accordance with claim 7 wherein the suspension comprises an added dispersing agent.

12. A method in accordance with claim 11 wherein the added dispersing agent is a normal alcohol of 3-10 carbon atoms, which stabilizes the suspension by steric hindrance.

13. A method in accordance with claim 3 wherein the particulate oxide has an average particle diameter in the range of 0.01-0.5 microns.

14. A method in accordance with claim 13 wherein the oxide is an amorphous fumed oxide.

15. A method in accordance with claim 14 wherein the amorphous fumed oxide consists essentially of one or more oxides selected from the group consisting of $SiO_2$, $P_2O_5$, $GeO_2$, $Al_2O_3$, $TiO_2$, $ZrO_2$, ZnO, MgO, $Sb_2O_5$ and $SnO_2$.

16. A method in accordance with claim 13 wherein the oxide is a crystalline fumed oxide.

17. A method in accordance with claim 16 wherein the oxide consists essentially of one or more oxides selected from the group consisting of $Al_2O_3$, $TiO_2$, $ZrO_2$, MgO, ZnO, $Sb_2O_5$ and $SnO_2$.

18. A method in accordance with claim 3 wherein the gelling agent comprises water.

19. A method in accordance with claim 18 wherein the gelling agent is an acidic or basic aqueous solution.

20. A method in accordance with claim 19 wherein the gelling agent is an aqueous $NH_4OH$ solution.

21. A method in accordance with claim 19 wherein the aqueous gelling agent is added to the suspension in combination with a vehicle-miscible liquid.

22. A method in accordance with claim 3 wherein the gelling agent is a non-aqueous vehicle-miscible liquid.

23. A method in accordance with claim 22 wherein the gelling agent is an alkylamine selected from the group consisting of 1,3 diaminopropane and heptylamine.

24. A method in accordance with claim 3 wherein the gelling agent is $NH_3$ gas.

25. A method in accordance with claim 3 wherein, prior to forming, the fluid suspension is mixed with at least one additional non-aqueous fluid suspension, said additional suspension containing a particulate oxide which differs in composition from the particulate oxide present in the first suspension, to provide a mixed suspension containing a mixture of particulate oxides.

26. A method in accordance with claim 25 wherein mixing is accomplished before either suspension has been destabilized.

27. A method in accordance with claim 25 wherein mixing is accomplished during or after at least one of said suspensions has been destabilized.

28. A method in accordance with claim 25 wherein the mixed suspensions are formed by casting as an overlayer upon at least one underlying layer, the underlying layer consisting essentially of a gelled non-aqueous suspension containing a mixture of oxides.

29. A method in accordance with claim 28 wherein the mixture of oxides in the underlying layer differs in composition from the mixture of oxides in the cast overlayer.

30. A method in accordance with claim 29 wherein the cast layers form a composition gradient in the selected configuration for the glass or ceramic product.

31. In the method for making a glass or ceramic product wherein a fluid composition comprising glass or ceramic precursors is gelled to provide a semisolid intermediate which is dried and, optionally, sintered to a non-porous product, the improvement wherein (a) the fluid composition is a non-aqueous suspension of a particulate glassy or crystalline oxide, the oxide having an average particle diameter not exceeding about 0.5 microns, (b) the suspension is destabilized by adding a gelling agent thereto, and (c) the suspension is formed, prior to gelation, into an intermediate having the configuration of the product.

32. In the method for making an optical waveguide fiber by first forming from a particulate glassy oxide material a porous glass preform comprising glass for the fiber core and/or cladding, thereafter heating the porous glass preform to consolidate the oxide particles to transparent non-porous glass, and thereafter further heating and drawing the transparent glass into optical fiber, the improvement wherein the porous glass preform is made by:

(a) casting a stable fluid suspension of particulate glassy oxide material into a configuration for the preform, said suspension comprising one or more particulate glassy oxides in a non-aqueous vehicle, the oxides being composed of oxide particles not exceeding about 0.5 microns in diameter;

(b) causing the cast suspension to gel in said configuration, by the addition of a gelling agent to the suspension, to provide a gelled casting; and (c) drying the gelled casting to remove the vehicle therefrom, thus to provide a substantially crack-free porous glass preform having the configuration of the gelled casting.

33. A method in accordance with claim 32 wherein the porous glass preform comprises glass for the fiber core.

34. A method in accordance with claim 33 wherein the glass is composed of $SiO_2$.

35. A method in accordance with claim 32 wherein the porous glass preform comprises glass for the fiber cladding.

36. In the method for making an optical waveguide fiber by first forming from a particulate glassy oxide material a porous glass preform comprising glass for the fiber core and/or cladding, thereafter heating the porous glass preform to consolidate the oxide particles to transparent non-porous glass, and thereafter further heating and drawing the transparent glass into optical fiber, the improvement wherein the porous glass preform is made by:

(a) preparing at least two stable fluid suspensions of particulate glassy oxide material, each suspension comprising one or more particulate glassy oxides in a non-aqueous vehicle, the oxide composition of each suspension differing from the oxide composition of the other suspensions but the oxide particles in all suspensions not exceeding about 0.5 microns in diameter;

(b) casting the suspensions into a configuration for the preform while varying the relative proportions of the suspensions introduced into the casting to produce corresponding variations in the composition of the casting;

(c) causing the cast suspensions to gel in the cast configuration, the addition of a gelling agent to the suspension, to provide a gelled casting; and (d) drying the gelled casting to remove the vehicle therefrom, thus to provide a crack-free porous glass preform having the configuration and composition variations of the gelled casting.

37. A method in accordance with claim 36 wherein the porous glass preform is built up by casting the suspensions in a succession of cast layers, each cast layer in the succession being caused to gel prior to the casting of the succeeding cast layer.

* * * * *